Nov. 18, 1941.   H. C. STEARNS   2,262,823
GAS VALVE
Filed Jan. 12, 1938

Inventor
Harry C. Stearns
By
George H Fisher
Attorney

Patented Nov. 18, 1941

2,262,823

UNITED STATES PATENT OFFICE 2,262,823

GAS VALVE

Harry C. Stearns, Minneapolis, Minn., assignor to Minneapolis-Honeywell Regulator Company, Minneapolis, Minn., a corporation of Delaware Application January 12, 1938, Serial No. 184,601

9 Claims. (Cl. 137—139)

The present invention relates to fluid flow control devices and more particularly to a combined snap acting and throttling valve for controlling the flow of gas to burners employed for heating or the like.

While two position "on" and "off" gas valves have long been used in heating and similar systems an objective of my invention is to enable those practicing it to capitalize upon the flexibility of such a fluid fuel medium as gas to the fullest extent. When two-position control of a fluid fuel is employed for heating purposes, the supply of heat is initiated only after a predetermined departure of the temperature in spaces being heated from a desired value. With modulating control, as provided in my invention, heat is supplied in direct accordance with the demand and the undesirable "on" and "off" operation with consequent inherent lag occasioned by the time delay in the heat reaching the spaces being served is avoided.

The initial opening of gas valves must be with a snap or quick action to avoid "pop backs" which would otherwise occur if gas were allowed to flow slowly through a slow opening valve. It is accordingly one of the objects of my invention to provide an improved gas valve having combined snap acting and modulating features, the modulation taking place after the valve has snapped to a minimum flow capacity position. Closing of the valve from minimum flow position is also with a snap movement.

In order to throttle gas flow properly in response to a thermostat or the like the modulating valve and control apparatus therefor must have accurate regulating characteristics if an even temperature is to be maintained under different load conditions necessitating different gas flow rates. From experience it has been found that it is impossible to secure accurate regulating characteristics in ordinary throttling valves used to control gas flow. This was due to vacuum effects produced underneath the throttling disc by the stream of gas passing through the valve. As flow rates vary these effects change irregularly imparting irregular increments to the forces employed for normally positioning the throttling disc in accordance with temperature or the like and destroying accurate regulation by the valve. This undesirable characteristic is most pronounced in valves having a variable capacity feature, that is, in valves which may have interchangeable parts for increasing or decreasing the effective port areas through which fluid may pass whereby a wide range of heating loads may be sustained. For example, in a valve of the type having a pressure diaphragm for operating the valve member, if the valve is stable and throttles properly at relatively large flow rates, at substantially lower flow rates the vacuum effects above described will be so reduced as to render the valve unstable and cause it to fully open at the time of the initial snap movement and act as a two-position valve rather than as a throttling valve. If a spring should be employed in such a valve in conjunction with the diaphragm to urge the valve member towards its seat, a different spring would be required at every substantially different flow rate to compensate for variation in the vacuum effects.

To overcome the above outlined difficulties it is another object of my invention to provide a throttling valve in which the above described vacuum effects are substantially eliminated. The attainment of this object results in only one spring biasing means being necessary over a wide range of flow rates whereby stable operation and accurate regulation are accomplished. Furthermore a predetermined operating differential of from 4° to 6° for example may be consistently maintained at the temperature responsive controlling instrument at various flow capacities whereas without my improvement the operating differential is unstable and varies substantially at different flow capacities. Thus the necessity of readjusting the thermostat or like instrument when capacity changes in the control valve are made is obviated.

Among other particular objects of my invention are:

The provision of a combined snap acting and modulating control valve having a throttling member so configurated that the regulating characteristics of the valve are substantially unaffected by the fluid stream passing through the valve.

Another object is to provide in a control valve, a throttling member comprising a disc having a projecting portion arranged to substantially eliminate irregular vacuum effects produced underneath the disc.

Another object is the provision in a control valve of a ported member with which a throttling element cooperates, the ported member being interchangeable with other similar ported members having different port arrangements for varying the valve capacity.

Another object is the provision in a control valve of a V-ported element having a throttling member cooperating therewith for varying the effective area of the V ports, the throttling member being configured so as to produce a smooth flow of fluid underneath itself for eliminating irregular vacuum effects.

A further object of the invention is the provision of throttling diaphragm type gas valve having a snap opening and closing feature and a resilient means urging the valve member in closing direction, the valve member being constructed and arranged to eliminate the effect of the fluid stream through the valve to unstabilize its regulating characteristics.

A further object of the invention is the provision of a valve structure comprising a ported flow control member having an annular chamber therearound forming a seat for a valve so that when the valve is unseated fluid is admitted to the annular chamber and the ported member.

A further object of the invention is the provision of a valve member comprising spaced discs of metal and resilient sealing material so arranged that the resilient material may engage the valve seat sealing it against flow through the valve, pressure seeking its way between the discs to hold the resilient material seated whereby minor irregularities in the resilient disc or valve seat do not cause leakage as would occur if the resilient material were backed by metal in the conventional manner. This object is particularly important in throttling valves where relatively great forces are not available for holding valves in seated position.

Other objects and advantages of my invention will make themselves apparent from the attached drawing and detailed description.

Figure 1:
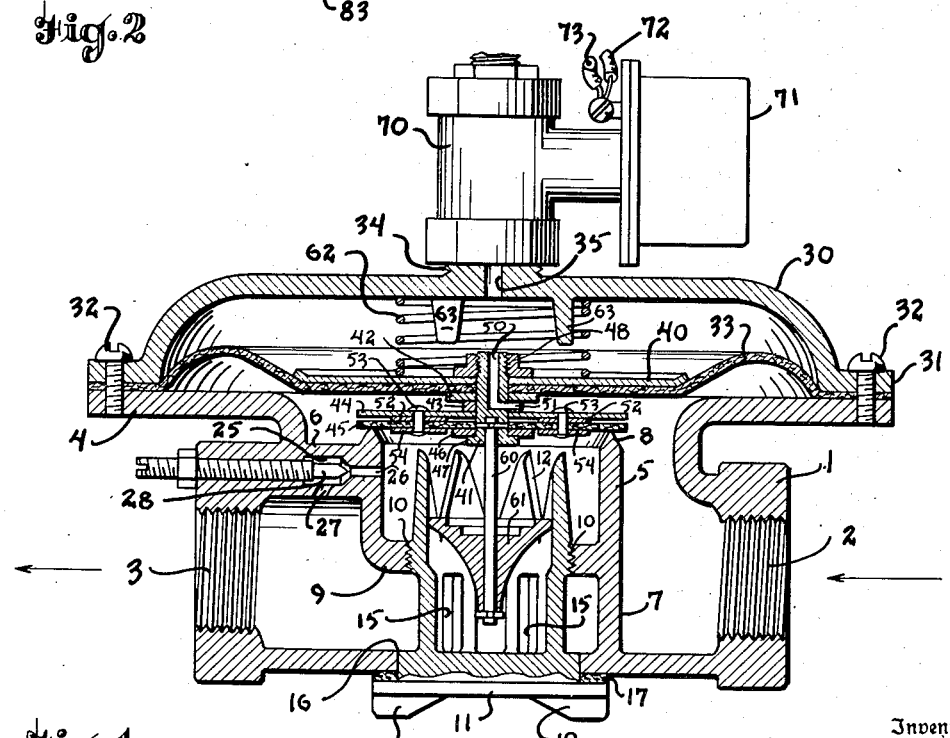
Figure 1 is a cross sectional view of the valve of my invention showing the details of construction thereof.

Referring to Figure 1 of the drawing, reference numeral 1 represents the body of my improved control valve. The body 1 has a threaded inlet opening as indicated at 2 and a similar outlet opening indicated at 3. The upper part of the body of the valve forms a flat circular portion 4 for purposes of securing a cover member to the valve body. Within the body 1 of the valve is a dividing portion 5 for dividing the inlet side of the valve from the outlet side. The dividing portion 5 comprises a generally cylindrical conformation as shown, connected by web portions 6 and 7 to the body 1 of the valve itself. The upper portion of the dividing member 5 is suitably machined as at 8 so as to provide a valve seat. The dividing member 5 has a horizontal portion 9 having a screw threaded opening 10 which receives a plug element 11 in screw threaded relation therewith. The plug element 11 is generally cylindrical and its upper end which is within the cylindrical portion of the dividing member 5 is serrated to form V ports 12 as shown. Plug element 11 has ports 15, as shown, in its lower portion communicating with the outlet side of the valve. It will be seen that the valve body 1 has an opening in its lower part through which extends the plug element 11, the element 11 having a portion 16 which fits in the said opening and having a flanged part 17 which engages the outer surface of the body 1 of the valve. The plug 11 has elements 18 and 19 which may be grasped manually for the purpose of unscrewing the plug and removing it from the valve.

Within the web portion 6 is an opening 25 which communicates with the interior of the cylindrical portion of the dividing member 5 through a port 26 and also with the outlet side of the valve through a port 27. The rate at which flow of fluid may take place through the port 26 is controlled by a needle valve 28 which may be adjusted as shown from outside the valve. The port 26, opening 25 and port 27 provide for a minimum rate of flow through the valve whenever it is in open position as will be hereinafter described.

Reference numeral 30 indicates a cap for the valve having a peripheral flange 31 which is secured to the flanged portion 4 of the valve body by screws 32. Interposed between the flanges 4 and 31 are the peripheral portions of a diaphragm 33 which seals the interior of the cap 30 from the main body of the valve. Integrally formed at the upper part of the cover 30 is a screw threaded nipple 34 having a gas bleed port 35 therein.

Arranged adjacent the central portion of the diaphragm 33 is a metal disc 40 and extending through an opening in the center of this disc and diaphragm 33 is a plug 41. Plug 41 also extends through openings in discs 42, 43, 44, 45 and 46, its lower end being flanged as seen at 47 so that when the nut 48 is screwed down on plug 41, all the discs may be retained in their proper relative engagement with each other. The plug 41 has a port therein as indicated at 50 communicating with a horizontal port 51 in the disc 43 providing communication between the upper side of the diaphragm 33 and the inlet side of the main valve. The disc 42 serves to space the ported disc 43 from diaphragm 33. It will be seen that the discs 44 and 45 are spaced from each other by spacing members 52, the discs and spacing members being secured together by rivets indicated at 53. The disc 45 is made of flexible material, such as leather or the like, as is ordinarily used for valve sealing members and therefore washers 54 are used at the lower ends of the rivets 53. The diaphragm 33 similarly may be made of leather or the like and therefore the spacing disc 42 is provided. Connected to the lower end of the plug 41 is a stem 60 to the lower end of which is attached by suitable means a throttling disc 61 which may be reciprocated within the upper V ported end of the plug 11. The conformation of the throttling disc 61 forms an important feature of my invention inasmuch as it has an important function as regards the stream of fluid which may pass through the V ports 12 into the interior of the plug 11 and out of the ports 15. It will be seen that the throttling disc 61 has a generally circular conformation having a circular tapering projecting portion extending downwardly therefrom, the projecting portion having a curved contour. The purpose of the particular configuration of the throttling disc 61 will be more precisely pointed out in connection with the description of the operation of my invention following.

It will be apparent that vertical movements of the diaphragm 33 will reciprocate the throttling disc 61 with respect to the V ports 12 and may cause the disc 45 to be seated on the seat 8. Interposed between the disc 40 and the inner surface of the cover 30 so as to bias the diaphragm 33 and the valve downwardly is a coil spring 62. Upward movement of diaphragm 33 against coil spring 62 is limited by stops 63 integrally formed with cover 30.

In screw threaded engagement with the nipple 34 is an electrically operated solenoid valve 70 for opening and closing communication through the bleed port 35. The valve 70 is operated by a solenoid of conventional type 71, energy therefor being provided by electrical conductors 72 and 73.

Figure 2:
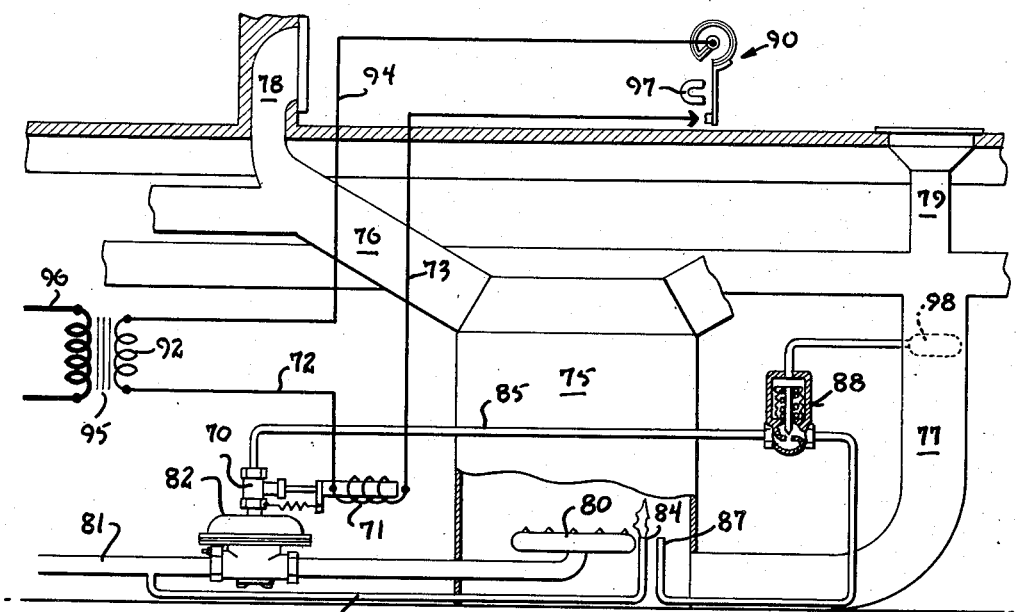
Figure 2 is a diagrammatic view of a warm air heating system having a gas fired furnace showing my improved gas valve incorporated in the system for controlling the fuel supply.

Figure 2 represents diagrammatically a gas fired warm air heating system having my improved control valve incorporated therein for regulating the supply of gas to the fuel burner. The principles of my invention and the manner of operation thereof may be best understood in connection with the system disclosed in Figure 2. Reference numeral 75 indicates a furnace having a warm air distributing conduit 76 communicating with the casing thereof and also a return air duct 77 for returning cooler air to the furnace casing. The distributing duct 76 may have branch ducts as indicated at 78 for conveying air to the individual rooms of the building and return air duct 77 may have branch ducts as indicated at 79 for conveying cooler air from individual rooms. The gas burner 80 within the combustion chamber is supplied with gaseous fuel from a gas main 81 in which is connected my improved control valve indicated generally at 82. A small pipe 83 conveys a supply of fuel from the gas main to a constantly burning pilot burner 84 which serves to ignite the fuel supplied to the main burner 80. Numeral 85 indicates a bleed line from the gas control valve which communicates with the bleed port 35, previously described, through the electrically operated valve 70. Bleed line 85 also communicates with an auxiliary burner 87 through a throttling valve 88. The solenoid winding 71 for controlling the electric valve 70 is connected to a room thermostat 90 by wire 73 and is also connected to one terminal of a transformer secondary winding 92 by wire 72. The winding 92 is connected to the thermostat 90 by a wire 94. The winding 92 forms the secondary winding of a step-down transformer indicated at 95 having primary winding 96 to which energy is supplied from a source of power (not shown). The thermostat 90 is of the conventional bimetallic element type having a small magnet 97 whereby it operates with a snap action to make or break an electrical circuit through the solenoid winding 71. Whenever the thermostat 90 closes the circuit through the winding 71 indicating a call for heat in the room the electric valve 70 is open permitting gas to bleed to the bleed line 85.

The throttling valve 88 may be of conventional type and is controlled by a thermostatic bulb 98 located in the return air duct 77. Bulb 98 is therefore responsive to the general temperature prevailing in the rooms being heated. Valve 88 obviously throttles the flow of gas being bled through the bleed line 85.

Assuming that the parts of my improved valve are in the position shown in Figure 2, the electric valve 70 being closed, and the thermostat 90 not calling for heat, the pressure above diaphragm 33 will be the same as the pressure below it by reason of inlet pressure being communicated through port 50. Should now the room temperature fall to a predetermined value causing the thermostat 90 to close, valve 70 will be opened permitting gas to bleed from above the diaphragm 33 through the bleed line 85 and valve 88 to the burner 87. Throttling valve 88 will be in an open position at this time inasmuch as the temperature in the rooms has fallen to a value indicating a need for heat. Reduction of the pressure above diaphragm 33 will cause it to lift by reason of the pressure underneath it thereby breaking the seal formed between disc 45 and seat 8. As soon as the seal breaks the additional force exerted by reason of the pressure now acting against the entire disc 45 will cause the diaphragm 33 to snap upwardly to a predetermined position as determined by the tension of the spring 62, and gas will now be supplied at a maximum rate through the main valve. This action depends upon the valve 88 being wide open because it will be understood that valve 88 is always capable of limiting the open position of the main valve. Part of the gas will be supplied through the needle valve 28 and part of it will flow through the V ports 12 and the ports 15. It will be seen that the needle valve 28 provides for a minimum flow rate of gas whenever the disc 45 is unseated, this valve by-passing the main throttle valve formed by the throttling disc 61. The rate of bleed through the bleed line 85 and therefore the pressure above diaphragm 33 will now be controlled by the throttling valve 88. The main diaphragm 33 and the throttling disc 61 will consequently be positioned in direct accordance with the temperature affecting bulb 98 and will operate to maintain a predetermined temperature in the rooms being heated.

The V ports 12 are so arranged that the effective area uncovered by the throttling disc 61 will supply fuel at a rate necessary to meet the heating load demands as measured by the thermostatic bulb 98. The lower part of the throttling disc 61 is configurated in the manner described above in the structural description to avoid having a flat surface on the underside of the disc which would cause suction effects to be produced underneath the disc by reason of gas flowing through the V ports 12 and to the space below the disc. Such suction effects would operate to cause the valve disc and diaphragm 33 to move upwardly and with ordinary throttling discs these upward forces are very irregular and entirely destroy accurate modulation by the valve. My improved throttling disc 61 has a streamlined configuration which removes these suction effects avoiding any influences upon the throttling effect of the valve other than that of the throttling thermostatic device 98. It will be readily seen that fluid passing through the V ports 12 will suffer no abrupt change in direction in striking the throttling disc 61 but its direction will be gradually changed with the fluid stream smoothly and evenly following the contour of the projecting portion of the throttling disc. It is thus seen that my arrangement presents a substantial improvement over heretofore known valves inasmuch as the fuel supply may be accurately throttled in accordance with the heating demands.

Should the temperature in the room being heated reach a predetermined value indicating no further need of heat supply to the rooms being served, the thermostat 90 breaks the circuit through the solenoid coil 71. This causes closure of the electric valve 70 preventing further bleed through the bleed port 35. Bleed from the inlet side of the valve through the port 50 continues until the pressure is equalized on opposite sides of the diaphragm 33. The diaphragm and its associated discs then settle due to their own weight and the force of the spring 62 until the disc 45 approaches its seat 8. Pressure below the disc 45 will then be diminished while pressure above disc 44 which is of equivalent area remains. Obviously an overbalancing force will exist which will move the valve downwardly to a firm seating position with a snap action. As soon as the pressure below disc 45 has diminished the peripheral portions of this disc will be drawn down against the seat 8 permitting pressure to seek its way between the disc 45 and disc 44. Disc 45 may then be held directly upon its seat by pressure acting directly thereon. The disc 45 being flexible may then conform to any irregularities which might be existent in the seat 8 thus providing a positive and effective seal.

If thermostatic bulb 98 should become satisfied before thermostat 90 the main valve may be closed by operation of valve 88. As the return air temperature rises the main valve will be throttled towards its minimum flow position as bulb 98 throttles valve 88. When the minimum flow position has been reached pressure will be diminished under disc 45 and diaphragm 33 will snap downwardly to closed position of the valve as above described.

The purpose of the needle valve 28 is to insure a minimum rate of flow when the valve is open so as to prevent "pop backs" which may occur if only a small amount of gas is permitted to flow through the main valve.

It may at times be desired to supply a bank or multiplicity of burners from a single control valve thus necessitating that the capacity of the valve be multipled. To accomplish this plug 11 may be manually unscrewed and a similar plug having a different arrangement of ports of different sizes may be inserted in its place. The capacity of the valve may be varied as desired depending upon the construction of the plug 11 used. By reason of the effect of the gas flow on the throttling disc 61 having been eliminated the valve will modulate properly at various flow capacities and a predetermined operating differential of the thermostatic bulb and valve 88 will be consistently maintained. In other words, if it is desired that the throttling valve shall be moved from minimum flow to maximum flow positions over a range from 4° to 6° or the like at the control thermostat this range will be preserved in my improved device even though the flow capacities may be changed by interchanging the plugs 11.

From the foregoing the numerous advantages and novel results attained by my invention should be apparent to those skilled in the art. By the employment of my improved valve greater economy may be obtained in the operation of gas heating systems by reason of accurate throttling of the gas flow and due to the interchangeability feature of plug 11 the device is extremely flexible and may be adapted to various size systems and may serve to control units connected in multiple. The device is of safe and reliable construction and does not employ parts that are likely to get out of order.

Having described in detail one embodiment of my invention it is to be understood that this disclosure is for illustrative purposes only and that the scope of the invention is to be limited only as determined by the appended claims.

I claim as my invention:

1. In a control valve, in combination, a quick moving diaphragm and a valve member, seating means for said valve member, said diaphragm being operable to move said valve member quickly upon opening to at least a position where it establishes a predetermined minimum flow, means for graduatingly moving said valve member between said minimum flow position and a maximum flow position, said valve member moving with respect to a port for regulating the flow of fluid therethrough, and said valve member being configurated to cause the fluid stream to smoothly follow its contour so that the graduating control characteristic of the valve is substantially unmodified by the fluid stream contacting said valve member.

2. In a control valve assembly, in combination, a valve having a seating portion and a throttling member, means comprising a ported member, said throttling member cooperating with said ported member for regulating the flow of fluid therethrough, means forming an annular chamber surrounding said ported member and having a seat for the seating portion of said valve, and a minimum flow capacity by-pass from said annular chamber to the outlet side of said ported member adapted to pass fluid therethrough whenever said valve is unseated.

3. In a control valve assembly, in combination, a quick moving diaphragm and a valve means, seating means for said valve means, said diaphragm being arranged to move said valve means quickly upon opening to at least a position where it establishes a predetermined minimum flow, resilient means biasing said valve means in closing direction, means for graduatingly moving said valve means between said minimum flow position and a maximum flow position, said valve means moving with respect to a port for regulating the flow of fluid therethrough and said valve means including a member constructed and arranged to cause the fluid stream to smoothly and regularly follow its contour so that the effect of the fluid stream thereon does not interfere with the regulating characteristics of the valve as determined by said valve moving means.

4. In a gas flow control valve, in combination, ported means and a valve member adjustable with respect to said means for regulating flow of gas therethrough, said ported means comprising a member having a graduated port adjacent which said valve member is reciprocated for varying the effective area of the port through which flow may take place, valve actuating means comprising a diaphragm and condition responsive means for actuating said valve member, said actuating means being of a type arranged for snapping said valve member from closed position to at least a position where it establishes a predetermined minimum flow and thereafter graduatingly moving said valve member with respect to said port, said valve member having a downstream portion so shaped with respect to said port that the fluid stream passing through said port is changed in direction by said portion and the fluid stream smoothly follows the contour of said portion whereby the graduating characteristic of said valve actuating means is not made unstable by irregular effects of the fluid stream on the valve member.

5. In a flow control valve structure, in combination, a valve body, means forming a fluid passage through said body, said means having a portion forming a valve seat and another portion having a port, a valve member comprising a disc element adapted to be seated on said seat and an element adapted to be moved adjacent said port, actuating means for said valve member whereby said disc element may be moved away from said seat and said second mentioned element may be graduatingly adjusted with respect to said port, flow of fluid through said passage forming means being first through said seat portion and then through said port, the low pressure side of the valve being beyond the port whereby said disc element is not exposed to fluid stream effects on the low pressure side of the valve, and said second mentioned element having a downstream portion so shaped that the fluid stream passing through said port is changed in direction by said portion and smoothly follows the contour of said portion whereby the graduating action of said valve actuating means is not made unstable by irregular effects of the fluid stream on the valve member.

6. In a control valve, in combination, valve means, seating means for said valve means, actuating means for moving said valve means away from said seating means, said actuating means being of a type operable to move said valve means quickly upon opening to at least a position where it establishes a predetermined minimum flow, said actuating means including means for graduatingly moving said valve means beyond said minimum flow position, said valve means moving with respect to a port for regulating the flow of fluid therethrough and said valve means having a portion so configurated as to cause the fluid stream to smoothly follow its contour to eliminate turbulence and vacuum effects which would otherwise occur and which would impair the graduating control characteristics of the valve.

7. In a valve structure, a valve housing having inlet and outlet openings and a pair of intermediate openings, a partition wall extending through said housing between said inlet and outlet openings and having an opening therethrough aligned with said intermediate openings, a plug removably secured in said valve housing and closing one of said intermediate openings, said plug having a cylindrical extension in the form of a valve sleeve extending through said opening in said partition wall, said valve sleeve having ports therethrough on opposite sides of said partition wall, the ports on one side of said partition wall varying in size longitudinally of said sleeve, a valve member slidable in said sleeve adjacent said ports of variable size, means closing said other intermediate opening including an operating member for said valve, and condition responsive means connected to said operating member for moving said valve member longitudinally of said sleeve to uncover variable portions of said ports.

8. In a valve structure, a valve housing having inlet and outlet openings and an intermediate opening, a partition wall extending through said housing between said inlet and outlet openings and having an opening therethrough aligned with said intermediate openings, a plug removably secured in said valve housing and closing said intermediate opening, said plug having a cylindrical extension in the form of a valve sleeve extending through said opening in said partition wall, said valve sleeve having ports therethrough on opposite sides of said partition wall, the ports on one side of said partition wall varying in size longitudinally of said sleeve, a valve member slidable in said sleeve adjacent said ports of variable size, and condition responsive means for moving said valve member longitudinally of said sleeve to uncover variable portions of said ports, said valve member having a concavely curved tapered portion extending in the direction of said other ports and serving to change the direction of the fluid passing through said ports of variable size without creating turbulent or vacuum effects.

9. In combination, a valve housing, a cylindrical valve sleeve secured to said housing and having ports extending transversely therethrough, said ports increasing in size longitudinally of said sleeve, a valve member slidable in said sleeve to permit flow through a variable portion of said ports, fluid pressure responsive means for positioning said valve member, and means for varying the fluid pressure in said fluid pressure responsive means for modulating the position of the valve member, said valve sleeve being so disposed with respect to the inlet and outlet openings of said valve housing that the fluid being valved enters said sleeve through said transversely disposed ports and then travels longitudinally of said sleeve, said valve member having a concavely curved, tapered portion to change gradually the path of the fluid entering said sleeve from a transverse direction to a longitudinal one without creating turbulent or vacuum effects.

HARRY C. STEARNS.